United States Patent
Harish

(10) Patent No.: US 7,980,145 B2
(45) Date of Patent: Jul. 19, 2011

(54) MICROELECTROMECHANICAL CAPACITIVE DEVICE

(75) Inventor: Divyasimha Harish, Union City, CA (US)

(73) Assignee: Y Point Capital, Inc, Fremont, CA (US)

( * ) Notice: Subject to any disclaimer, the term of this patent is extended or adjusted under 35 U.S.C. 154(b) by 0 days.

(21) Appl. No.: 11/964,739

(22) Filed: Dec. 27, 2007

(65) Prior Publication Data

US 2009/0165572 A1    Jul. 2, 2009

(51) Int. Cl.
G01R 27/26    (2006.01)
G01L 1/12    (2006.01)
G01L 7/16    (2006.01)

(52) U.S. Cl. .............. 73/862.626; 324/660; 324/661

(58) Field of Classification Search ........... 324/658, 324/660, 661; 73/862.626, 780
See application file for complete search history.

(56) References Cited

U.S. PATENT DOCUMENTS

| | | | | |
|---|---|---|---|---|
| 6,079,282 | A * | 6/2000 | Lanter .................. | 73/862.626 |
| 6,435,033 | B2 * | 8/2002 | Delaye .................. | 73/754 |
| 6,504,385 | B2 * | 1/2003 | Hartwell et al. .......... | 324/662 |
| 6,604,425 | B1 * | 8/2003 | Hsu et al. ............... | 73/718 |
| 7,111,518 | B1 * | 9/2006 | Allen et al. ............. | 73/715 |
| 7,347,102 | B2 * | 3/2008 | Moon et al. ............. | 73/780 |
| 7,712,373 | B2 * | 5/2010 | Nagle et al. ............. | 73/780 |
| 2005/0061082 | A1 * | 3/2005 | Dallenbach et al. ....... | 73/780 |
| 2005/0103112 | A1 * | 5/2005 | Pedersen et al. .......... | 73/718 |
| 2005/0187482 | A1 * | 8/2005 | O'Brien et al. ........... | 600/486 |
| 2006/0066319 | A1 * | 3/2006 | Dallenbach et al. ....... | 324/662 |
| 2006/0096384 | A1 * | 5/2006 | Harish et al. ............ | 73/780 |
| 2007/0107524 | A1 * | 5/2007 | O'Brien et al. ........... | 73/754 |
| 2007/0125178 | A1 * | 6/2007 | Rosenau et al. .......... | 73/724 |
| 2007/0199385 | A1 * | 8/2007 | O'Brien et al. ........... | 73/718 |
| 2007/0261497 | A1 * | 11/2007 | O'Brien et al. ........... | 73/724 |
| 2007/0261894 | A1 * | 11/2007 | Harish ................... | 177/211 |
| 2008/0058632 | A1 * | 3/2008 | Tai et al. ................ | 600/398 |
| 2008/0190210 | A1 * | 8/2008 | Harish et al. ............ | 73/780 |
| 2008/0229847 | A1 * | 9/2008 | Harish ................... | 73/862.625 |
| 2008/0238884 | A1 * | 10/2008 | Harish ................... | 345/174 |
| 2009/0160462 | A1 * | 6/2009 | Harish ................... | 324/686 |

OTHER PUBLICATIONS

D'Apuzzo, Massimo. "Electric Sensing Devices." Wiley Encyclopedia of Electrical and Electronics Engineering. John Wiley & Sons, Inc. 1999.*

Duck-Bong Seo and Robin Shandas "Design and simulation of MEMS-based comb-drive pressure sensor for pediatric post-operative monitoring applications." 2003 Summer Bioengineering Conference, Jun. 25-29. Key Biscayne, Florida.*

Nair, Kavita, Chris Zillmer, Dennis Polla, Ramesh Harjani. "Data Acquisition and Conversion." Wiley Encyclopedia of Electrical and Electronics Engineering. Ed. John G. Webster. vol. 4. 1999. 492-505.*

* cited by examiner

Primary Examiner — Lisa M Caputo
Assistant Examiner — Punam Roy
(74) Attorney, Agent, or Firm — Raj Abhyanker, P.C.

(57) ABSTRACT

Methods and devices based on a microelectromechanical capacitive sensor are disclosed. In one embodiment, a method for fabricating an electromechanical capacitive device includes forming a housing of the electromechanical capacitive device using a non-conductive material and applying a conductive material on one or more areas on the housing to form one or more pairs of conductor plates.

3 Claims, 11 Drawing Sheets (A)

(B)

(A)

(B)

(A) SUBSTRATE ETCH (B) NON-CONDUCTIVE MATERIAL DEPOSITION (C) NON-CONDUCTIVE MATERIAL ETCH (D) BONDING LAYER DEPOSITION (E) CONDUCTOR PLATE DEPOSITION (F) NON-CONDUCTIVE MATERIAL DEPOSITION (G) CONDUCTOR PLATE DEPOSITION (G) BONDING (H) WAFER DISSOLUTION

US 7,980,145 B2

MICROELECTROMECHANICAL CAPACITIVE DEVICE

FIELD OF TECHNOLOGY

This disclosure relates generally to the technical fields of measuring devices and, in one example embodiment, to a fabrication method and system of a microelectromechanical sensor device.

BACKGROUND

A capacitive device measures a change in capacitance due to a pressure, a force and/or other form of energy applied to the capacitive device. In the process, the capacitive device converts the change in capacitance to an electrical value. New structural layers built on a substrate may form a miniaturized capacitive device to save some area and/or power taken up by a larger version of the capacitive device.

However, in the case of the miniaturized capacitive device, it may be difficult to calibrate its sensitivity, thus resulting in inaccuracy in the measurement. Additionally, the pressure, the force, and/or other form of energy applied to the miniaturized capacitive device may wear it out prematurely. Furthermore, the fabrication process of the miniaturized capacitive device may be cumbersome, time-consuming and/or costly when several components need to be formed in the process.

SUMMARY

Accordingly, what is needed is more efficient manner of fabricating a microelectromechanical capacitive device. What is further needed is more durable microelectromechanical capacitive device that can withstand the pressure or force applied to it without sacrificing the accuracy in measurement.

One embodiment of the present invention pertains to a microelectromechanical capacitive device having a capacitor with one or more pairs of conductor plates, a housing of a non-conductive material to encompass the capacitor. The microelectromechanical capacitive device further includes a circuit to measure a capacitance change of the capacitor based on a deflection of the housing due to a force or a pressure applied to the housing.

Another embodiment of the present invention pertains to a method for fabricating a microelectromechanical capacitive device. The method includes forming a housing of the microelectromechanical capacitive device using a non-conductive material and applying a conductive material on one or more areas on the housing to form one or more pairs of conductor plates.

In yet another embodiment, a system includes a microelectromechanical capacitive device based on a capacitor encompassed in a housing to measure a capacitance change in the capacitor based on a deflection of the housing due to a force or a pressure applied to the housing and a device dependent to the microelectromechanical capacitive device.

As illustrated in the detailed description, other embodiments also pertain to a durable and precision microelectromechanical capacitive device and method through constructing its housing with resilient material and forming one or more types of capacitors in the housing.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
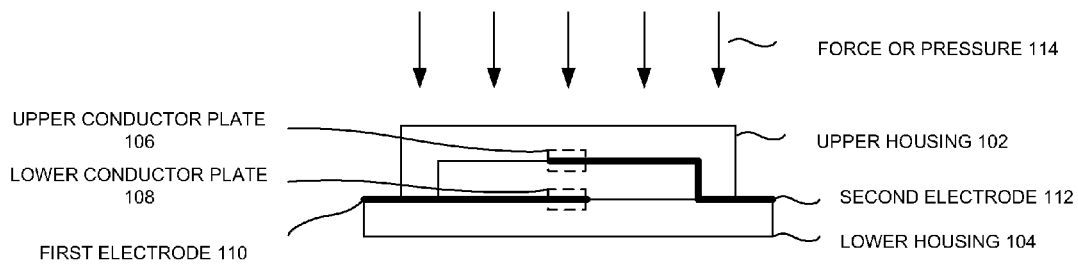
FIGS. 1A and 1B are exemplary cross-sectional views of a gap changing microelectromechanical capacitive device.
Figure 1B:
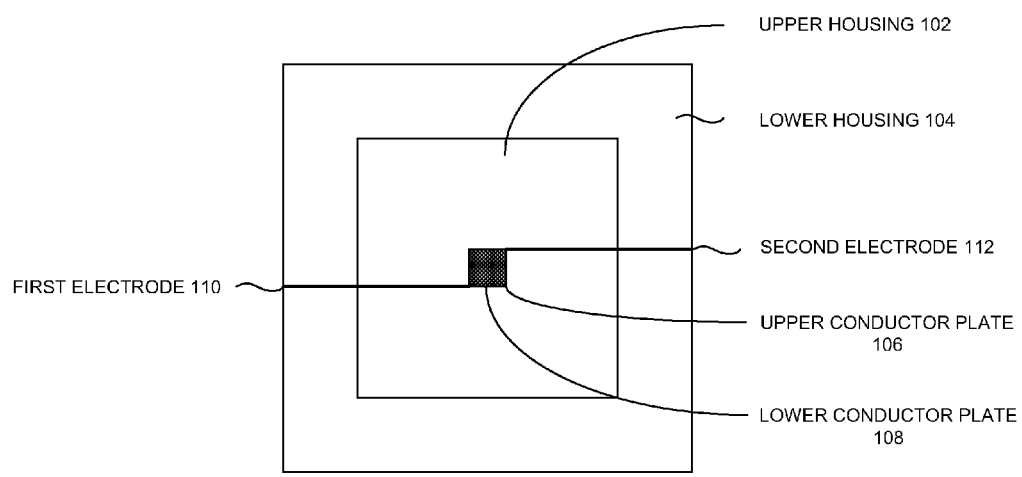

FIGS. 1A and 1B are exemplary cross-sectional views of a gap changing microelectromechanical capacitive device. As illustrated in FIGS. 1A and 1B, the gap changing microelectromechanical capacitive device (e.g., sensor) includes an upper housing 102, a lower housing 104, an upper conductor plate 106, a lower conductor plate 108, a first electrode 110, and a second electrode 112.

A capacitor is formed between the upper conductor plate 106 and the lower conductor plate 108 (e.g., substantially parallel to each other) when a uniform voltage is applied between the first electrode 110 (e.g., which connects to the lower conductor plate 108) and the second electrode 112 (e.g., which connects to the upper conductor plate 106). As will be illustrated in details in FIG. 1C, a force or pressure 114 applied on top of the upper housing 102 causes the upper housing 102 to deflect towards the lower housing 104, thus resulting in a change in capacitance.

The change in capacitance is fed to a circuit (e.g., a Wheatstone Bridge based on one or more of capacitors and/or resistors) which converts to its electrical value. The upper housing 102 and the lower housing 104 may be made of a non-conductive material. The upper conductor plate 106 and the lower conductor plate 108 may be made of a conductive material and/or a semiconductor material. The first electrode 110 and the second electrode 112 may be made of metal.

The shape of the upper housing 102 and the lower housing 104 may take the shape of a circle, a triangle, a square, a rectangular, a pentagon, a hexagon, an octagon, and so on. Likewise, the shape of the upper conductor plate 106 and the lower conductor plate 108 may take the shape of a circle, a triangle, a square, a rectangular, a pentagon, a hexagon, an octagon, and so on.

In one example embodiment, multiple sets of the upper conductor plate 106 and the lower conductor plate 108 (e.g., three) may be formed inside the housing to make the gap changing microelectromechanical capacitive device more sensitive to the force or pressure 114 applied. Accordingly, the installation of multiple sets of the conductor plates may make it easier to calibrate the gap changing microelectromechanical capacitive device.

Figure 1C:
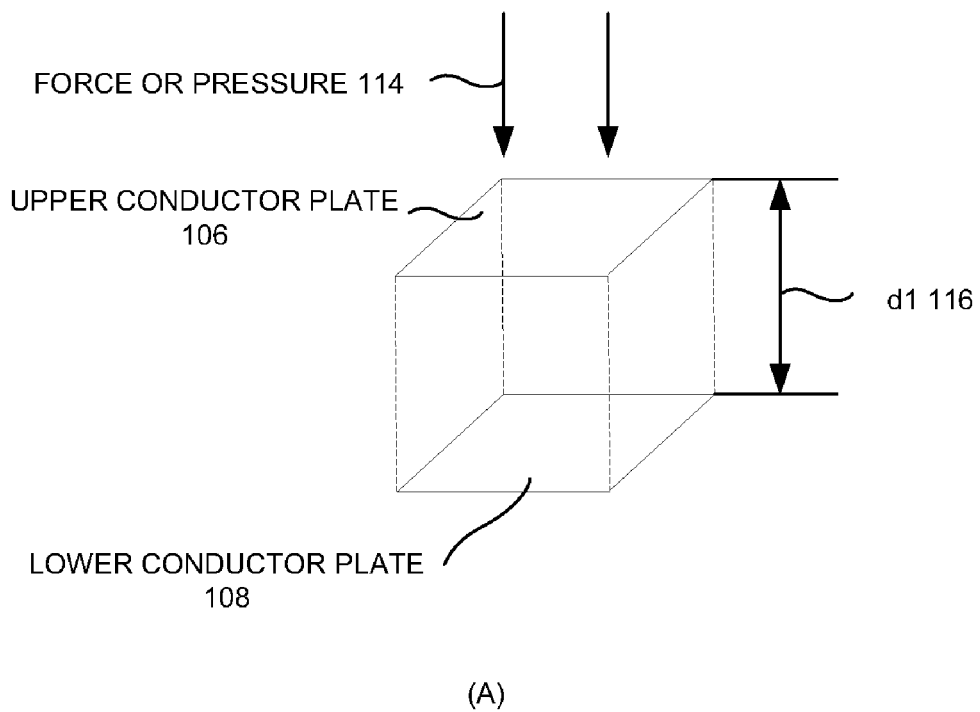
FIG. 1C is an exemplary operational view of the gap changing microelectromechanical capacitive device of FIGS. 1A and 1B.
Figure 1C:
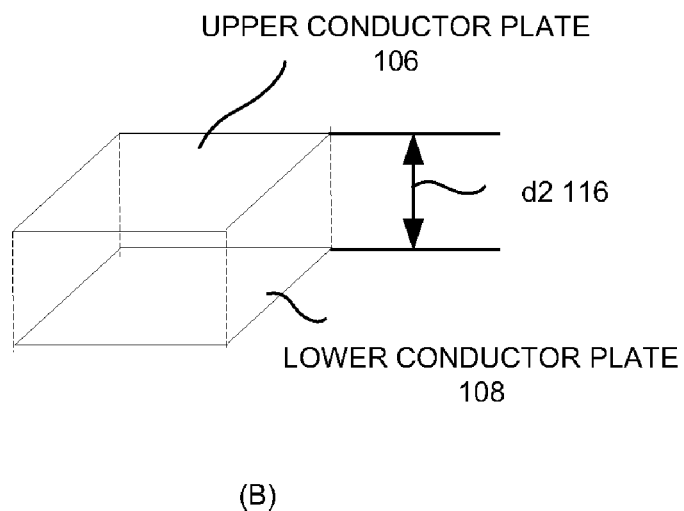

FIG. 1C is an exemplary operational view of the gap changing microelectromechanical capacitive device of FIGS. 1A and 1B. In the initial state of the gap changing microelectromechanical capacitive device as illustrated in FIG. 1C (A), the distance between the upper conductor plate 106 and the lower conductor plate 108 is d1 116. When the force or pressure 114 is applied to the microelectromechanical capacitive device as illustrated in FIG. 1C (B), the distance between the upper conductor plate 106 and the lower conductor plate 108 is decreased to d2 116.

Because $C=kA/D$ where $C$=capacitance, $k$=constant, $A$=area, and $D$=distance, the capacitance due to the force or pressure 114 increases as the distance between the two plates (e.g., the upper conductor plate 106 and the lower conductor plate 108) decreases. The change in capacitance is routed to the circuit which converts it to an electrical value (e.g., a voltage, a frequency, etc.).

In one example embodiment, a microelectromechanical capacitive device is a capacitor with a pair of conductor plates (e.g., parallel to each other) contained in a housing made of a non-conductive material. A circuit (e.g., internal or external to the microelectromechanical capacitive device) connects to electrodes of the microelectromechanical capacitive device to measure a capacitance change of the capacitor based on a deflection of the housing (e.g., thus decreasing the distance between the two conductor plates) due to a force or a pressure applied to the housing. The pair of conductor plates may be formed through applying a conductive material to one or more areas (e.g., the inner surface) of the housing.

Figure 2A:
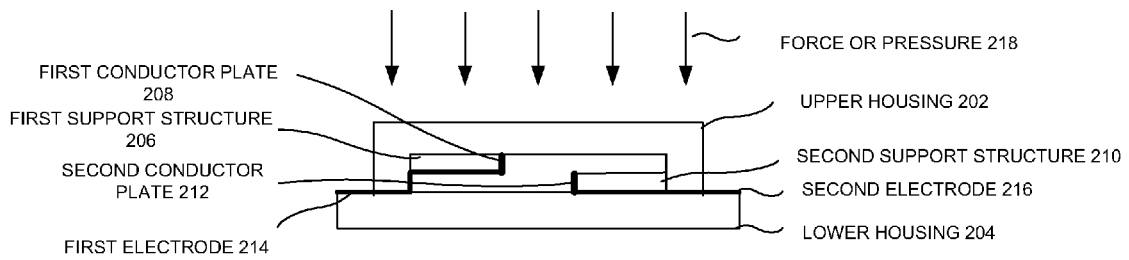
FIGS. 2A and 2B are exemplary cross-sectional views of an area changing microelectromechanical capacitive device.
Figure 2B:
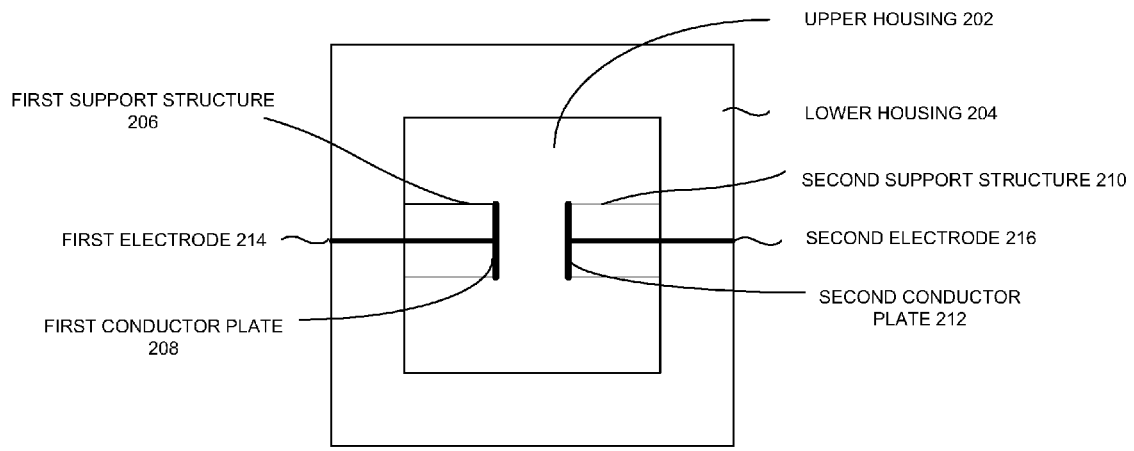

FIGS. 2A and 2B are exemplary cross-sectional views of an area changing microelectromechanical capacitive device. As illustrated in FIGS. 2A and 2B, the area changing microelectromechanical capacitive device (e.g., sensor) includes an upper housing 202, a lower housing 204, a first support structure 206, a first conductor plate 208, a second support structure 210, a second conductor plate 212, a first electrode 214, and a second electrode 216.

A capacitor is formed when there is an overlap between the first conductor plate 208 and the second conductor plate 212 (e.g., substantially parallel to each other) while a uniform voltage is applied between the first electrode 214 (e.g., which connects to the first conductor plate 208) and the second electrode 216 (e.g., which connects to the second conductor plate 212). As will be illustrated in details in FIG. 2C, a force or a pressure 218 applied on top of the upper housing 202 causes the first conductor plate 208 to move closer to the second conductor plate 212, thus resulting in a change in capacitance (e.g., due to a change in the area overlapping the first conductor plate 208 and the second conductor plate 212).

The change in capacitance is also fed to a circuit (e.g., a Wheatstone Bridge based on one or more of capacitors and/or resistors) which converts to its electrical value. The upper housing 202 and the lower housing 204 may be made of a non-conductive material. The first conductor plate 208 and the second conductor plate 212 may be made of a conductive material and/or a semiconductor material. The first electrode 214 and the second electrode 216 may be made of metal.

The shape of the upper housing 202 and the lower housing 204 may take the shape of a circle, a triangle, a square, a rectangular, a pentagon, a hexagon, an octagon, and so on. Likewise, the shape of the first conductor plate 208 and the second conductor plate 212 may take the shape of a circle, a triangle, a square, a rectangular, a pentagon, a hexagon, an octagon, and so on.

In one example embodiment, multiple sets of the first conductor plate 208 (e.g., with the first support structure 206) and the second conductor plate 212 (e.g., with the second support structure 210) may be formed inside the housing to make the area changing microelectromechanical capacitive device more sensitive to the force or pressure 218 applied. Accordingly, the installation of multiple sets of the conductor plates may make it easier to calibrate the area changing microelectromechanical capacitive device.

Figure 2C:
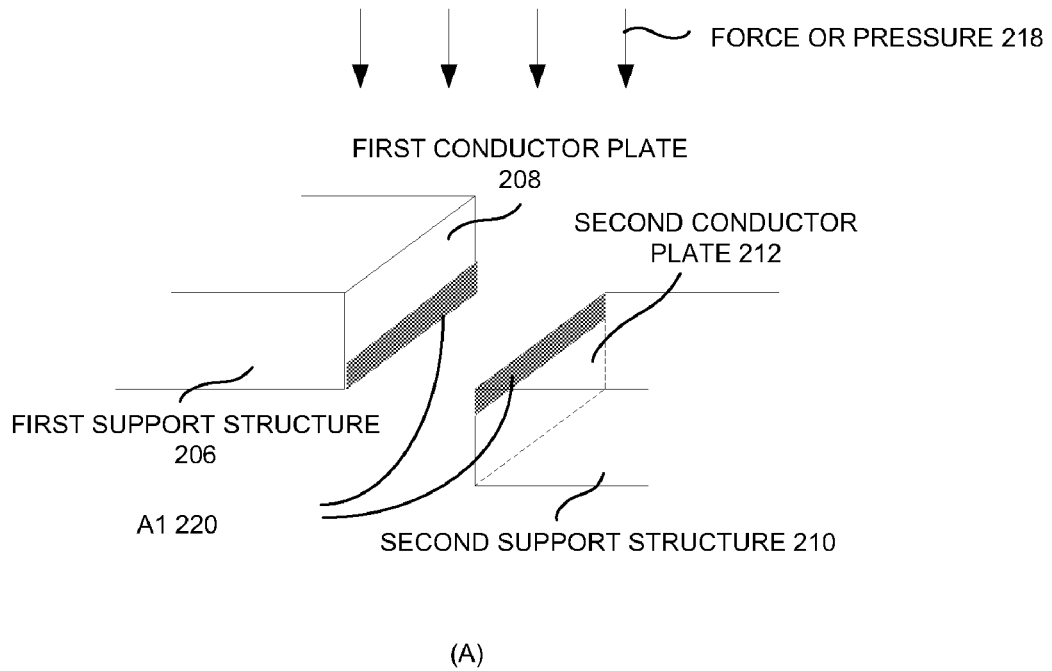
FIG. 2C is an exemplary operational view of the area changing microelectromechanical capacitive device of FIGS. 2A and 2B.
Figure 2C:
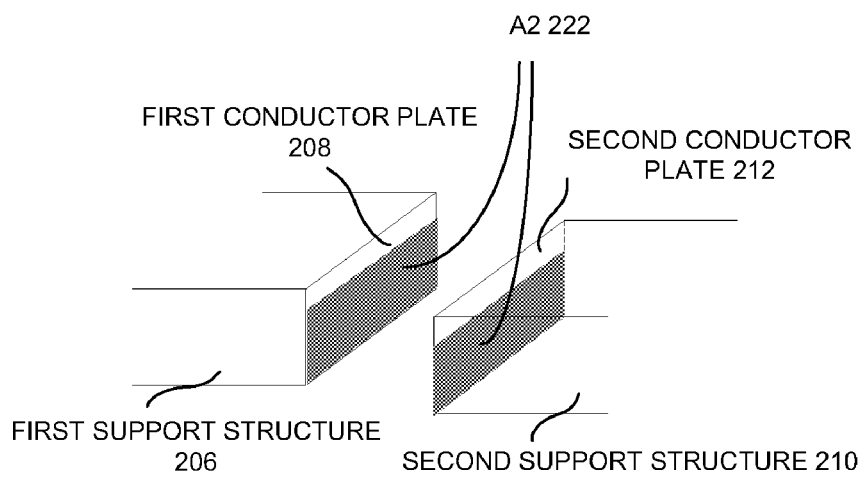

FIG. 2C is an exemplary operational view of the area changing microelectromechanical capacitive device of FIGS. 2A and 2B. In the initial state of the area changing microelectromechanical capacitive device as illustrated in FIG. 2C (A), the overlap area between the first conductor plate 208 (e.g., formed on the first support structure 206) and the second conductor plate 212 (e.g., formed on the second support structure 210) is A1 220. When the force or pressure 218 is applied to the microelectromechanical capacitive device as illustrated in FIG. 2C (B), the overlap area between the first conductor plate 208 and the second conductor plate 212 is increased to A2 222.

Because $C=kA/D$ where $C$=capacitance, $k$=constant, $A$=area, and $D$=distance, the capacitance due to the force or pressure 218 increases as the overlap area between the two plates (e.g., the first conductor plate 208 and the second conductor plate 212) increases. The change in capacitance is also routed to the circuit which converts it to an electrical value (e.g., a voltage, a frequency, etc.).

In one example embodiment, a microelectromechanical capacitive device is a capacitor with a pair of conductor plates (e.g., parallel to each other) contained in a housing made of a non-conductive material. A circuit (e.g., internal or external to the microelectromechanical capacitive device) connects to electrodes of the microelectromechanical capacitive device to measure a capacitance change of the capacitor based on a deflection of the housing (e.g., thus increasing the area overlapped by the two conductor plates) due to a force or a pressure applied to the housing. The pair of conductor plates may be formed through building one or more support structures extending from the housing and applying a conductive material to one or more areas of the support structures.

Figure 3A:
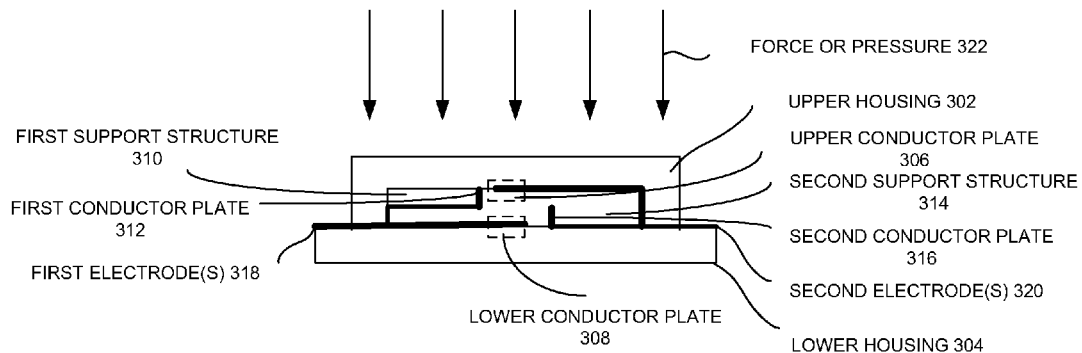
FIGS. 3A and 3B are exemplary cross-sectional views of a microelectromechanical capacitive device based on changes in both the gap and overlap area of conductor plates of the microelectromechanical capacitive device.
Figure 3B:
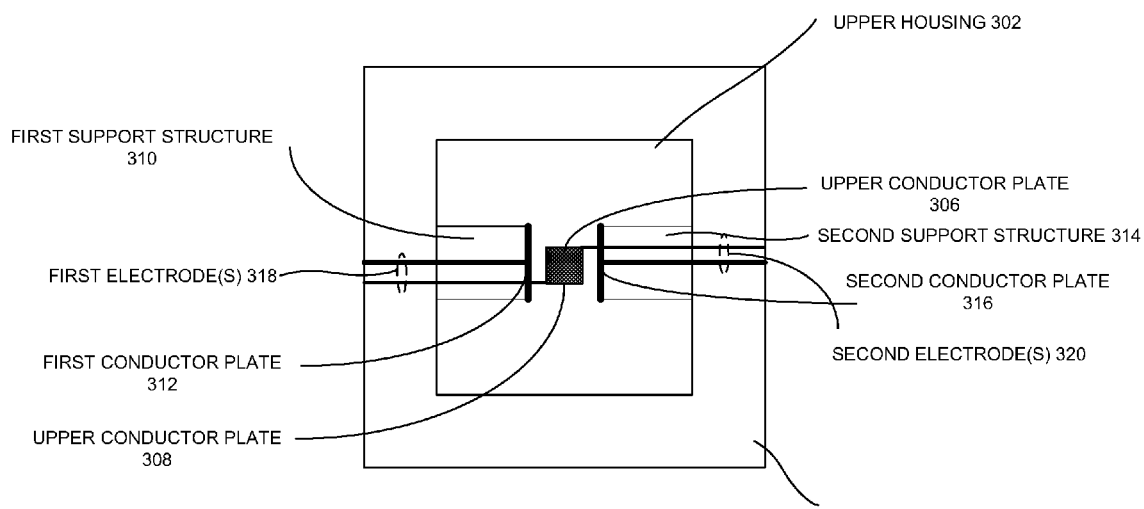

FIGS. 3A and 3B are exemplary cross-sectional views of a microelectromechanical capacitive device based on changes in both the gap and overlap area of conductor plates of the microelectromechanical capacitive device. As illustrated in FIGS. 3A and 3B, the microelectromechanical capacitive device (e.g., sensor) includes an upper housing 302, a lower housing 304, a upper conductor plate 306, a lower conductor plate 308, a first support structure 310, a first conductor plate 312, a second support structure 314, a second conductor plate 316, a first electrode 318, and a second electrode 320.

Two capacitors are formed based on a gap changing capacitor between the upper conductor plate 306 and the lower conductor plate 308 (e.g., substantially parallel to each other) and an area changing capacitor between first conductor plate 312 and the second conductor plate 316 (e.g., substantially parallel to each other) while a uniform voltage is applied between the first electrode 318 (e.g., which connects to the lower conductor plate 308 and the first conductor plate 312) and the second electrode 320 (e.g., which connects to the upper conductor plate 306 and the second conductor plate 316).

Alternatively, two separate sets of electrodes may be connect to each of the upper conductor plate 306/lower conductor plate 308 and the first conductor plate 312/second conductor plate 316. As will be illustrated in details in FIG. 3C, a force or a pressure 322 applied on top of the upper housing 302 causes the upper conductor plate 306 to move close to the lower conductor plate 308 and/or the first conductor plate 312 to move closer to the second conductor plate 316, thus resulting in a change in capacitance (e.g., due to a change in the distance between the upper conductor palate 306 and the lower conductor plate 308 and/or a change in the area overlapped by the first conductor plate 312 and the second conductor plate 316).

The combination of the gap changing capacitor and the area changing capacitor may provide a wider range of capacitance measured by the microelectromechanical capacitive device than solely relying on either the gap changing capacitor or the area changing capacitor. The working or features of the microelectromechanical capacitive device is similar to the workings of the gap changing capacitive device of FIGS. 1A, 1B, and 1C and/or the area changing capacitive device of FIGS. 2A, 2B, and 2C in principle.

In one example embodiment, a microelectromechanical capacitive device may contain two capacitors with each capacitor with a pair of conductor plates (e.g., parallel to each other). A circuit (e.g., internal or external to the microelectromechanical capacitive device) connects to electrodes of the microelectromechanical capacitive device to measure changes taking place in the two capacitors due to a force or a pressure applied to the housing. One of the two capacitors may be based on the gap changing capacitor of FIGS. 1A, 1B, and 1C, whereas the other one of the two capacitors may be based on the area changing capacitor of FIGS. 2A, 2B, and 2C.

Figure 4A:
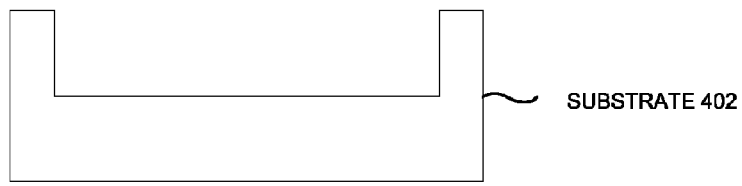
FIG. 4A is an exemplary process for fabricating an upper part of the housing of the gap changing microelectromechanical capacitive device in FIGS. 1A, 1B, and 1C.
Figure 4A:
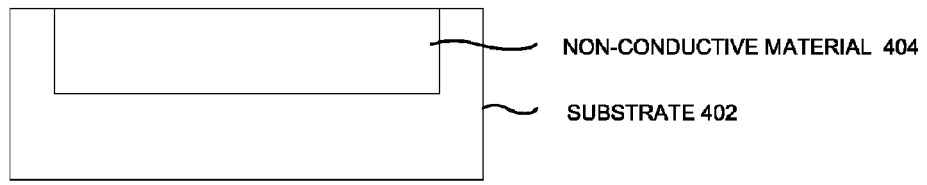
Figure 4A:
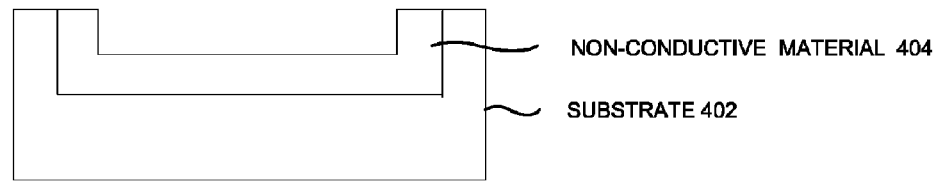
Figure 4A:
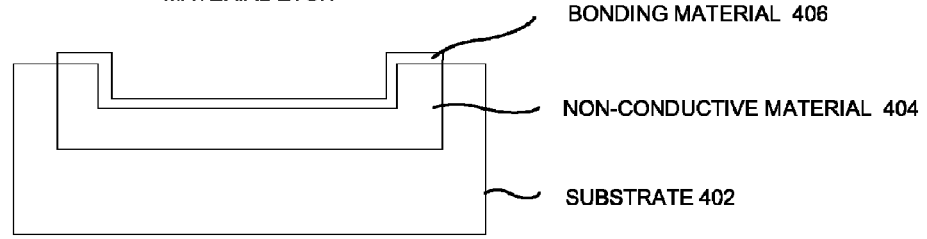
Figure 4A:
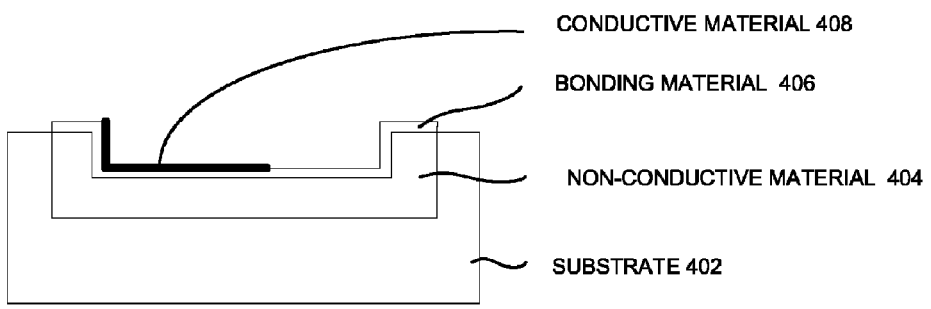

FIG. 4A is an exemplary process for fabricating an upper part of the housing of the gap changing microelectromechanical capacitive device in FIGS. 1A, 1B, and 1C. As illustrated in step (A) of FIG. 4A, a cavity is formed by etching (e.g., a wet chemical etching, a dry etching, etc.) a substrate 402 (e.g., a silicon, a glass, etc.) once a mask is applied to the substrate 402. In step (B), a non-conductive material 404 or a semiconductor material (e.g., a ceramics, a paper, a mica, a polyethylene, a glass, and a metal oxide) is deposited on the substrate 402 using a physical vapor deposition, a chemical vapor deposition, and/or a planarization.

In one example embodiment, the non-conductive material 404 or the semiconductor material may be a material resilient to a force or pressure applied to the non-conductive material 404 (e.g., the upper housing of the microelectromechanical capacitive device), such as a silicon-on-insulator (SOI) wafer, a single crystal silicon wafer, and a polysilicon wafer. The resilient material may extend the lifecycle of the microelectromechanical capacitive device as it is able to withstand the wear and tear caused by the force or pressure applied to the non-conductive material 404. The resilient material (e.g., the non-conductive material 404) may be formed in a desired membrane thickness (e.g., several microns to several tens microns).

In step (C), the non-conductive material 404 is etched using the physical vapor deposition, the chemical vapor deposition, and/or the planarization to form an inner cavity of the microelectromechanical capacitive device. This etching step may be also used to form the desired membrane thickness for the non-conductive material 404. In step (D), a bonding material 406 (e.g., a polysilicon, an amorphous silicon, etc. of about 100 to 10,000 angstroms) is deposited over the inner surface of the non-conductive material 404 using a low pressure chemical vapor deposition (LPCVD), a plasma enhanced chemical vapor deposition (PECVD), an atmospheric pressure chemical vapor deposition (APCVD), or by sputtering.

In step (E), a conductive material 408 (e.g., a metal such as copper or gold or a non-metal such as a graphite or a plasma) may be deposited to a designated area on the surface of the bonding material 408 and/or the non-conductive material 404. The conductive material 408 may form the upper conductor plate 106 of FIG. 1 in the middle and the second electrode 112 towards the edge of the upper housing 102 made of the non-conductive material 404.

In other example embodiments, steps (C), (D), and (E) of FIG. 4A may be altered to form the area changing microelectromechanical capacitive device of FIGS. 2A, 2B, and 2C as well as the microelectromechanical capacitive device having both the gap changing and area changing capacitors of FIGS. 3A and 3B. For instance, in between steps (C) and (D), deposition and/or etching steps may be taken to form the support structure 206 of FIG. 2 for the first conductor plate 208.

Figure 4B:
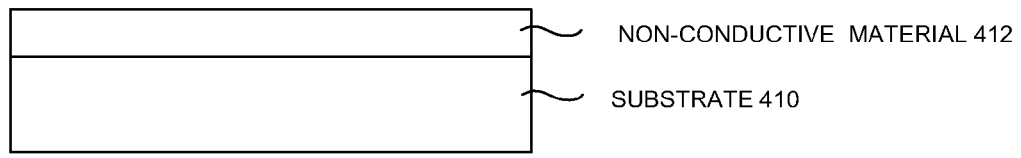
FIG. 4B is an exemplary process for fabricating a lower part of the housing of the gap changing microelectromechanical capacitive device in FIGS. 1A, 1B, and 1C.
Figure 4B:
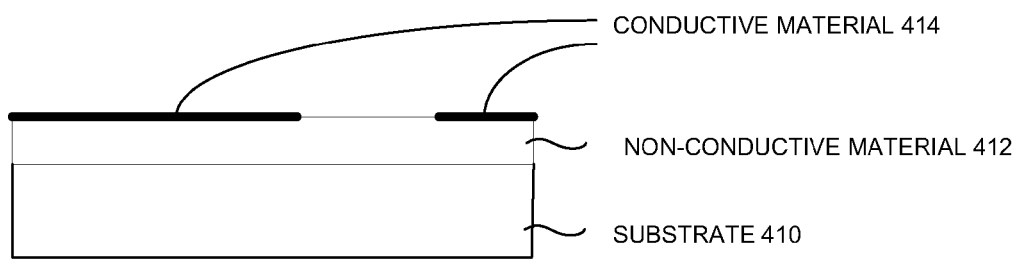

FIG. 4B is an exemplary process for fabricating a lower part of the housing of the gap changing microelectromechanical capacitive device in FIGS. 1A, 1B, and 1C. In step (F), a non-conductive material 412 or a semiconductor material (e.g., a ceramic, a paper, a mica, a polyethylene, a glass, and a metal oxide) is deposited on a substrate 410 (e.g., a silicon or a glass). The layer of the non-conductive material 412 forming the lower part of the housing may be thicker than the layer of the non-conductive material 404 forming the upper part of the housing.

In step (E), a conductive material 414 (e.g., a metal such as copper or gold or a non-metal such as a graphite or a plasma) may be deposited to a designated area on the surface of the non-conductive material 412. The conductive material 414 may form the lower conductor plate 108 of FIG. 1 in the middle and the first electrode 110 and the second electrode 112 towards the edges of the lower housing 104 made of the non-conductive material 412. The process for fabricating the lower part of the area changing microelectromechanical capacitive device of FIGS. 2A, 2B, and 2C and/or the microelectromechanical capacitive device having both the gap changing and area changing capacitors of FIGS. 3A and 3B may be similar to the process described above.

Figure 4C:
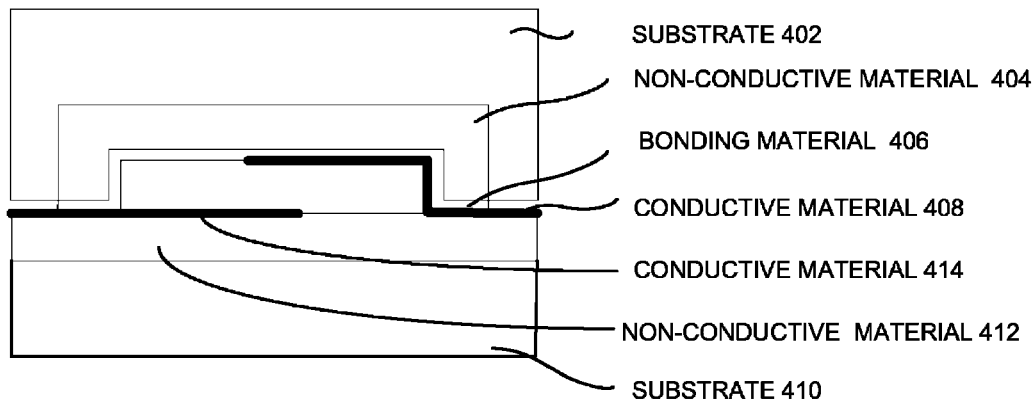
FIG. 4C is an exemplary process for assembling the upper housing formed in FIG. 4A and the lower housing formed in FIG. 4B.
Figure 4C:
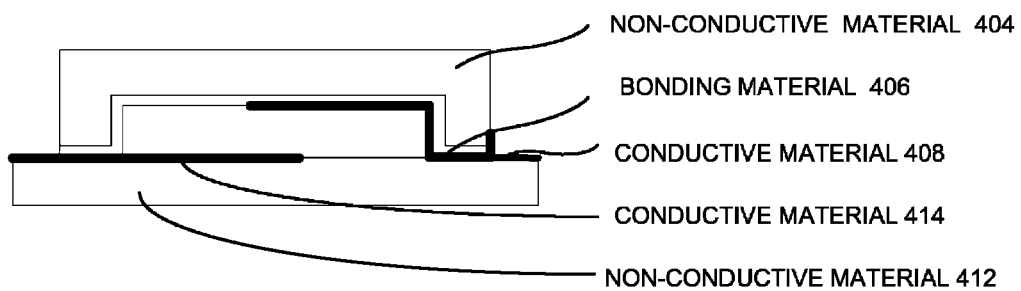

FIG. 4C is an exemplary process for assembling the upper housing formed in FIG. 4A and the lower housing formed in FIG. 4B. In step (G) of FIG. 4C, the upper housing formed through the steps illustrated in FIG. 4A is bonded with the lower housing formed through the steps illustrated in FIG.

4B. In step (H), the substrate 402 and the substrate 410 are dissolved by a chemical etching process (e.g., with ethylene diamine pyrocatechol water, KOH, etc.)

The process for assembling the upper housing and the lower housing for the area changing microelectromechanical capacitive device of FIGS. 2A, 2B, and 2C and/or the microelectromechanical capacitive device having both the gap changing and area changing capacitors of FIGS. 3A and 3B may be similar to the process described above.

Figure 5A:
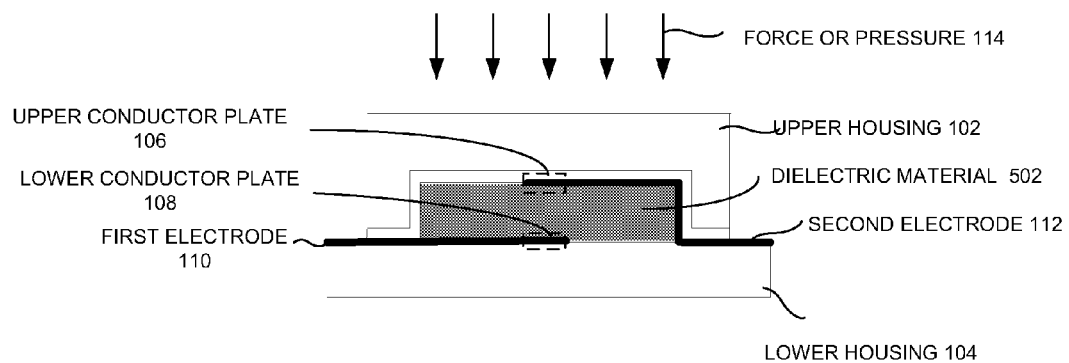
FIGS. 5A and 5B are exemplary cross sectional views of the gap changing microelectromechanical capacitive device of FIG. 1A with a solid dielectric material filling the inner cavity of the housing.
Figure 5B:
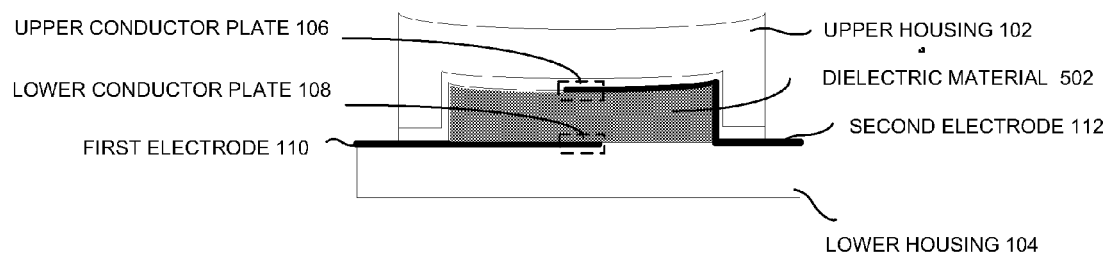

FIGS. 5A and 5B are exemplary cross sectional views of the gap changing microelectromechanical capacitive device of FIGS. 1A, 1B, and 1C with a solid dielectric material filling the inner cavity of the housing. In FIG. 5A, the force or pressure 114 is applied to the upper housing 102 causing the upper housing to distort, thus displacing the upper conductor plate 106. The dielectric material 502 may be a solid (e.g., a porcelain, mica, glass, plastic, and/or metal oxide), a liquid (e.g., a distilled water), and a gas (e.g., a dry air). The dielectric material 502 may be a vacuum as well.

In the case of the liquid or the gas dielectric, the upper housing 102 of the gap changing microelectromechanical capacitive device may be distorted when the force or pressure 114 applied to the upper housing is significantly bigger than the force or pressure present in the inner cavity of the gap changing microelectromechanical capacitive device. This may in turn cause the upper housing 102 to collapse. To prevent this from happening, a spacer may be inserted between the upper housing 102 and the lower housing 104.

Alternatively, a solid dielectric material (e.g., the porcelain, mica, glass, plastic, and/or metal oxide) may be used to fill the inner cavity. The solid dielectric may preserve the shape of the upper housing 102 at the expense of measurement sensitivity. In yet another embodiment, more resilient material (e.g., a silicon-on-insulator (SOI) wafer, a single crystal silicon wafer, a polysilicon wafer, etc.) may be used to form the housing of the gap changing microelectromechanical capacitive device.

Figure 6:
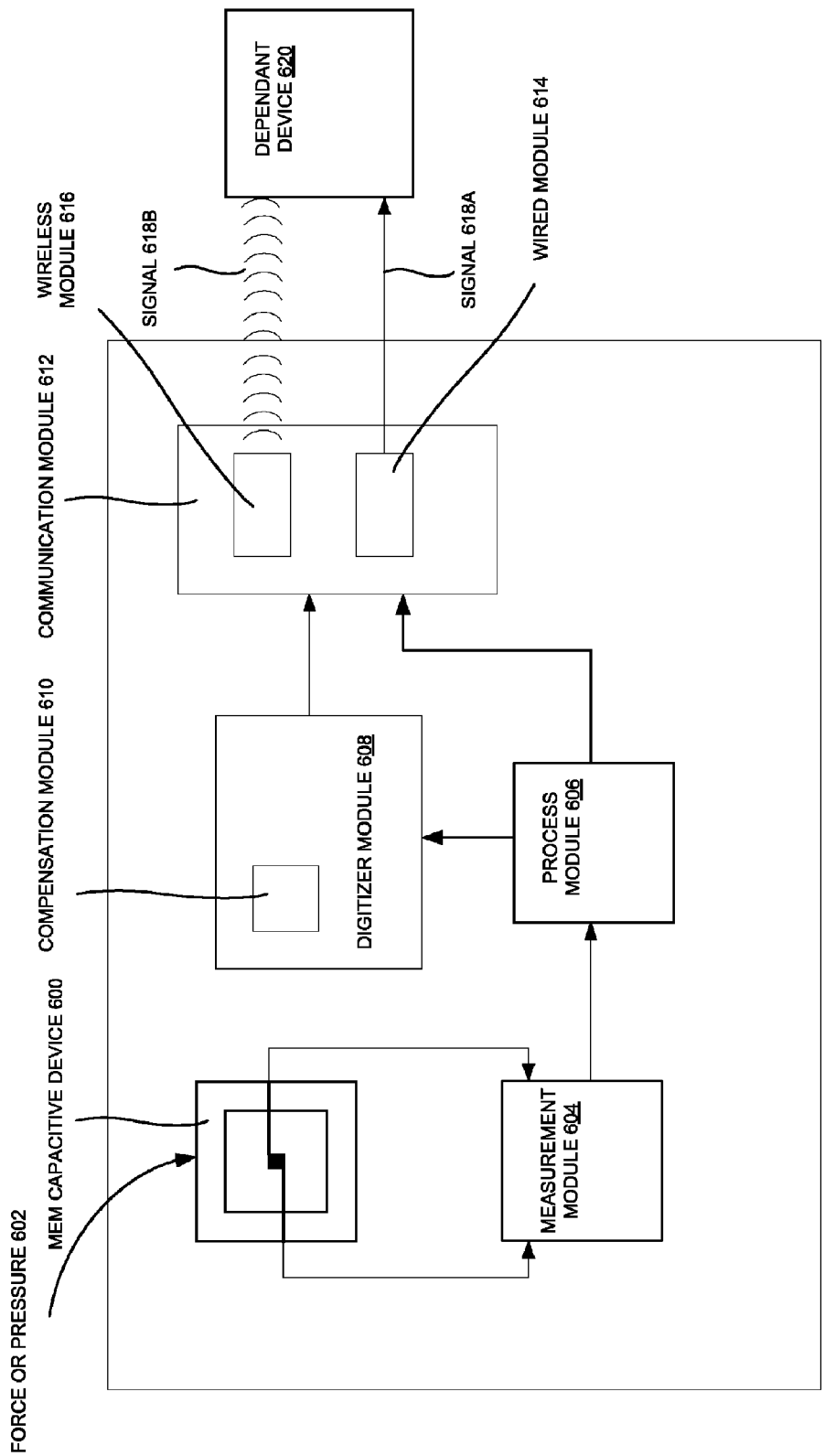
FIG. 6 is an exemplary block diagram of a microelectromechanical capacitive device.

FIG. 6 is an exemplary block diagram of a microelectromechanical capacitive device 600 communicating with a dependant device 620. In FIG. 6, a force or pressure 602 deflects the upper housing of the microelectromechanical capacitive device 600. An electronic circuitry (e.g., a measurement module 604) may be used to measure the capacitance generated by the displacement between two conductor plates (e.g., such as the upper conductor plate 106 and the lower contact plate 108) in the case of the gap changing microelectromechanical capacitive device of FIGS. 1A, 1B, and 1C and/or by the change in the area overlapped by two conductor plates (e.g., such as the first conductor plate 208 and the second conductor plate 212) in the case of the area changing microelectromechanical capacitive device of FIGS. 2A, 2B, and 2C when the force or pressure 602 is applied to the MEM capacitive device 600.

Next, the capacitance (e.g., due to the distance change and/or area change) may be converted to a voltage and/or frequency. The capacitance, voltage, and/or frequency may be processed by a process module 606 (e.g., a microprocessor). The process module 606 may execute a set of instructions associated with the digitizer module 608 (e.g., an analog to digital converter), the compensation module 610, and/or the communication module 612. The digitizer module 608 may convert the capacitance, voltage, and/or frequency to a digital value.

The compensation module 610 may subtract one or more distortion factors from the capacitance measured by the MEM capacitive device 600 to minimize the effect of the one or more distortion factors ascribed to the MEM capacitive device 600. The communication module 612 includes a wired module 614 and a wireless module 616. The wired module 614 may communicate a universal serial bus (USB) signal, a voltage signal, a frequency signal, and/or a current signal in an analog and/or digital format to the dependant device 620. The wireless module 616 may wirelessly communicate with the dependent device based on one or more of wireless universal serial bus (USB), a Wi-Fi (e.g., of a wireless local area network), a Bluetooth (e.g., of a wireless personal area network), and/or a Zigbee (e.g., of the wireless personal are network).

Additionally, a reference sensor may generate a capacitance based on one or more environmental factors (e.g., a humidity, a temperature, an air pressure, a radiation, etc.). Therefore, the environmental factors may be removed from the measurement of capacitance generated by the MEM capacitive device 600 when the force or pressure 602 is applied.

In one example embodiment, a system includes a microelectromechanical capacitive device (e.g., which is based on a capacitor encompassed in a housing to measure a capacitance change in the capacitor based on a deflection of the housing due to a force or a pressure applied to the housing) and a device dependent to the microelectromechanical capacitive device. The microelectromechanical capacitive device is internal or external to the device. Additionally, the microelectromechanical capacitive device is connected to the device based on a wired or wireless technology.

Figure 7:
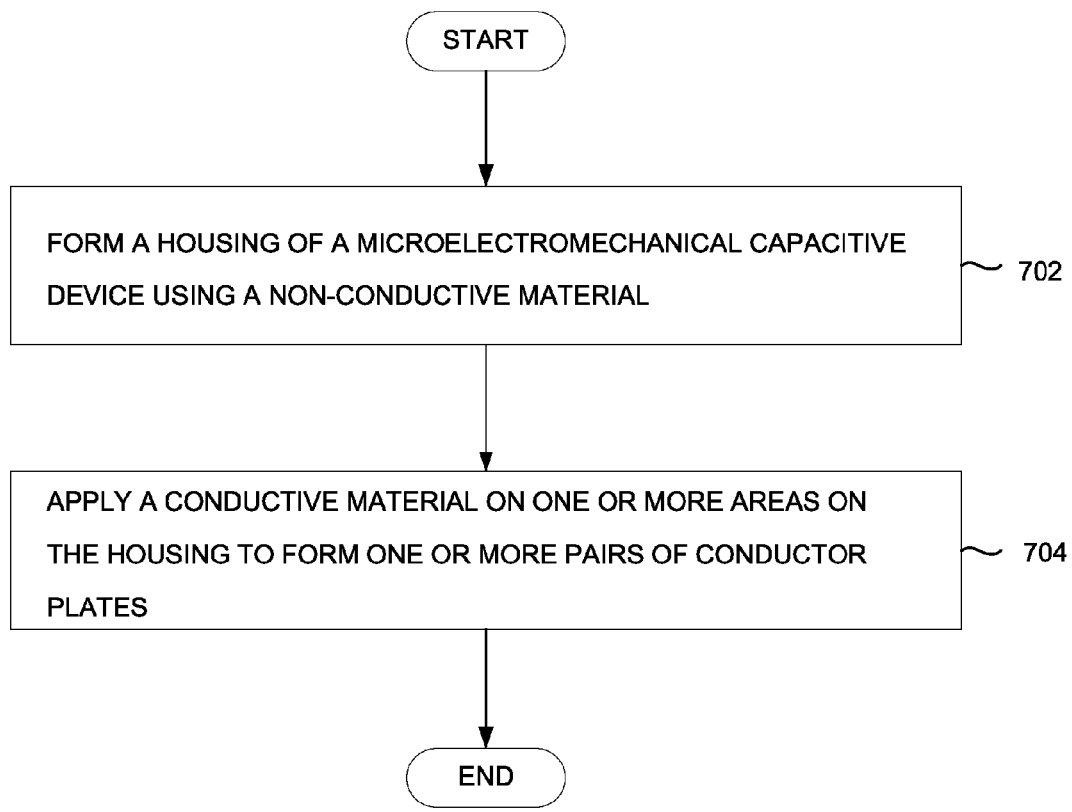
FIG. 7 is an exemplary process flow chart for fabricating a microelectromechanical capacitive device.

FIG. 7 is an exemplary process flow chart for fabricating a microelectromechanical capacitive device. In operation 702, a housing (e.g., between 5 microns and 5 millimeters in diameter) of a microelectromechanical capacitive device is formed using a non-conductive material. In operation 704, a conductive material is applied on one or more areas of the housing to form one or more pairs of conductor plates.

In one example embodiment, an upper part of the housing may be formed by etching a substrate to form a cavity, depositing the non-conductive material (e.g., which is resilient to a force or pressure applied to the housing) to the cavity, etching the non-conductive material to form an inner cavity of the housing, and applying a bonding material to a surface of the non-conductive material (e.g., a silicon-on-insulator (SOI) wafer, a single crystal silicon wafer, and/or a polysilicon wafer).

The inner cavity of the housing may be filled with a solid dielectric material (e.g., a ceramics, a paper, a mica, a polyethylene, a glass, and a metal oxide) to prevent a collapse of the housing due to the force or the pressure applied to the housing. The upper part of the housing may be bonded with a lower part of the housing (e.g., which is formed by depositing another layer of non-conductive material on another substrate). The process of forming the housing with one or more capacitors may be completed when the substrates are dissolved.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A force measuring device, comprising:
a microelectromechanical capacitor comprised of at least one set of two parallel conductor plates;
a housing of a non-conductive material to encompass the microelectromechanical capacitor, wherein the housing comprises an upper housing and a lower housing coupled to the upper housing forming a cavity, wherein the non-conductive material is at least one of a silicon-on-insulator, a single crystal silicon wafer, a poly silicon wafer, a polymeric material, and kapton, wherein a solid dielectric is used to fill the cavity between the upper housing and the lower housing;
a circuit to measure a capacitance change of the microelectromechanical capacitor based on a deflection of the housing due to a force or a pressure applied to the housing;
wherein the capacitance change is associated with at least one of a change in area overlapped by the two parallel conductor plates of a second set of two parallel conductor plates, and a change in distance between a set of two parallel conductor plates of a first set of two parallel conductor plates due to the deflection of the housing;
a device dependent to the microelectromechanical capacitor, wherein the device dependent to the microelectromechanical capacitor is at least one of internal and external to the force measuring device;
a digitizer module coupled to the circuit to convert the capacitance change to digital data;
a compensation module coupled to the circuit to minimize a distortion of the digital data by applying at least one distortion factor to the digital data;
a communication module to communicate with the device dependent to the microelectromechanical capacitive through a wired channel or a wireless channel; and
a processor to execute a set of instructions associated with the digitizer module, the compensation module, and the communication module.

2. A system for a force measuring device, comprising:
a microelectromechanical capacitive device based on a capacitor encompassed in a housing to measure a capacitance change in the capacitor based on a deflection of the housing due to a force or a pressure applied to the housing, wherein the microelectromechanical capacitive device is at least one of internal and external to the force measuring device, wherein an upper part of the housing is formed by etching a substrate to form a cavity, depositing a non-conductive material to the cavity, etching the nonconductive material to form an inner cavity of the housing and applying a bonding material to a surface of the non-conductive material; wherein a solid dielectric is used to fill the inner cavity between the upper housing and the lower housing;
a first set of two parallel conductor plates, wherein the capacitance change is further based on a change in distance between the first set of two parallel conductor plates and a change in area overlapped by a second set of two parallel conductor plates; and
a device dependent to the microelectromechanical capacitive device, the microelectromechanical capacitive device is coupled to the dependent device via a wired or wireless technology.

3. A force measuring device, comprising:
a microelectromechanical capacitor with at least one pair of conductor plates;
a housing of a non-conductive material to encompass the microelectromechanical capacitor, wherein the housing comprises an upper housing and a lower housing coupled to the upper housing forming a cavity, wherein a solid dielectric is used to fill the inner cavity between the upper housing and the lower housing, wherein the non-conductive material is at least made of one of a silicon-on-insulator, a single crystal silicon wafer, a poly silicon wafer, and a poly silicon wafer, wherein a spacer is used to fill the cavity between the upper housing and the lower housing; and
a circuit to measure a capacitance change of the microelectromechanical capacitor based on a deflection of the housing due to a force or a pressure applied to the housing, wherein the at least one pair of conductor plates are formed through applying a conductive material to at least one area of the housing, and wherein the at least one pair of conductor plates comprise two sets of two parallel conductor plates and wherein the capacitance change is based on a change in distance between a first set of two parallel conductor plates and a change in area overlapped by a second set of two parallel conductor plates.

* * * * *